Figure 1:
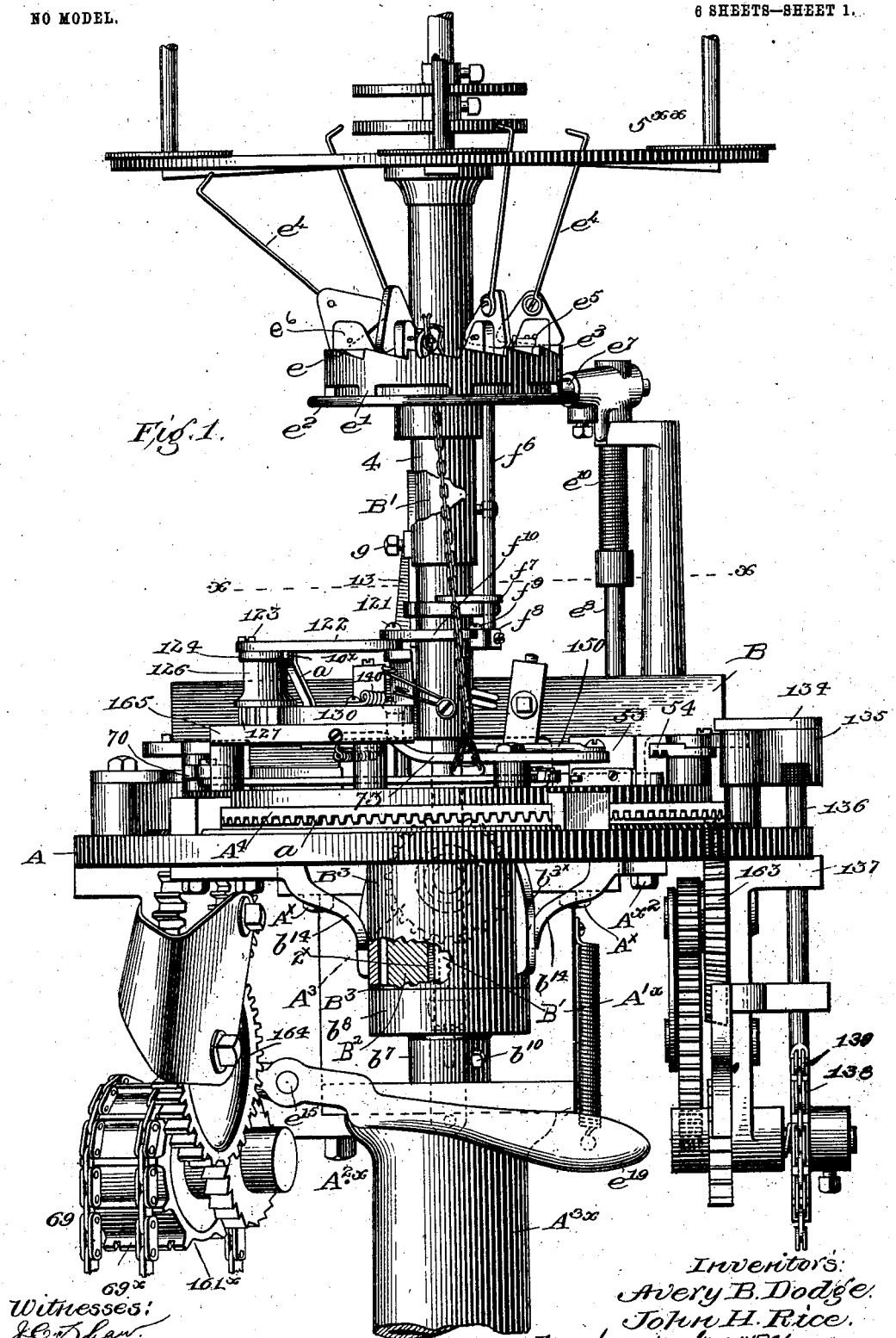

No. 720,514. PATENTED FEB. 10, 1903.
A. B. DODGE & J. H. RICE.
KNITTING MACHINE.
APPLICATION FILED DEC. 4, 1900.
NO MODEL. 6 SHEETS—SHEET 3.

Witnesses:
J. C. Shaw.
E. F. Allen.

Inventors.
Avery B. Dodge
John H. Rice,
by Crosby & Gregory
Attys.

No. 720,514. PATENTED FEB. 10, 1903.
A. B. DODGE & J. H. RICE.
KNITTING MACHINE.
APPLICATION FILED DEC. 4, 1900.
NO MODEL. 6 SHEETS—SHEET 4.
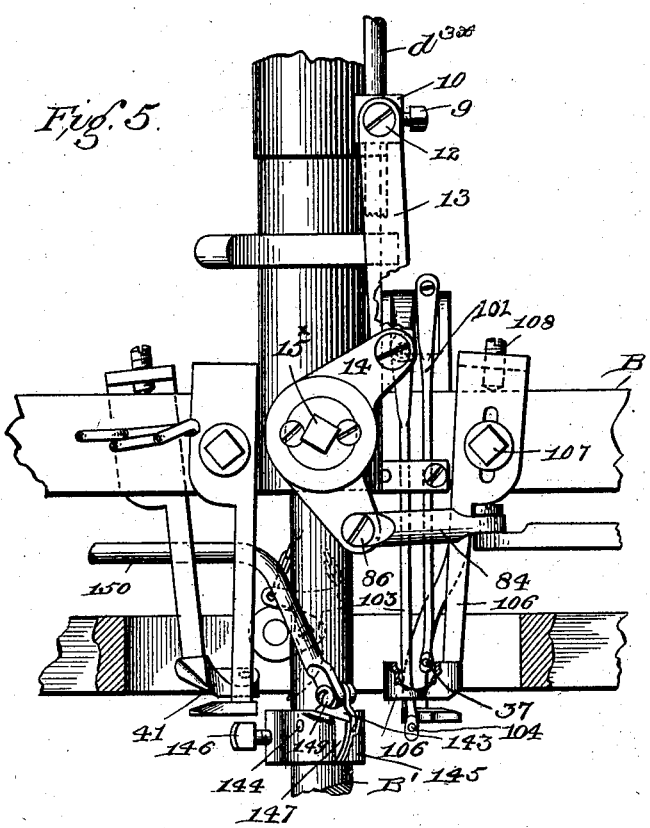
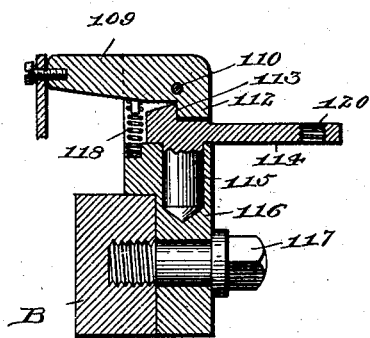
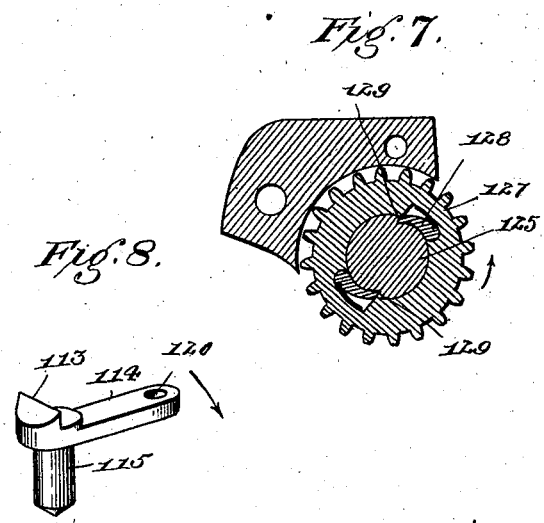
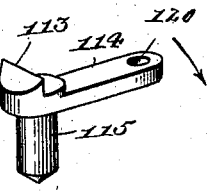
Witnesses
J. C. Shaw
E. F. Allen
Inventors
Avery B. Dodge
John H. Rice
by Crosby & Gregory
Attys

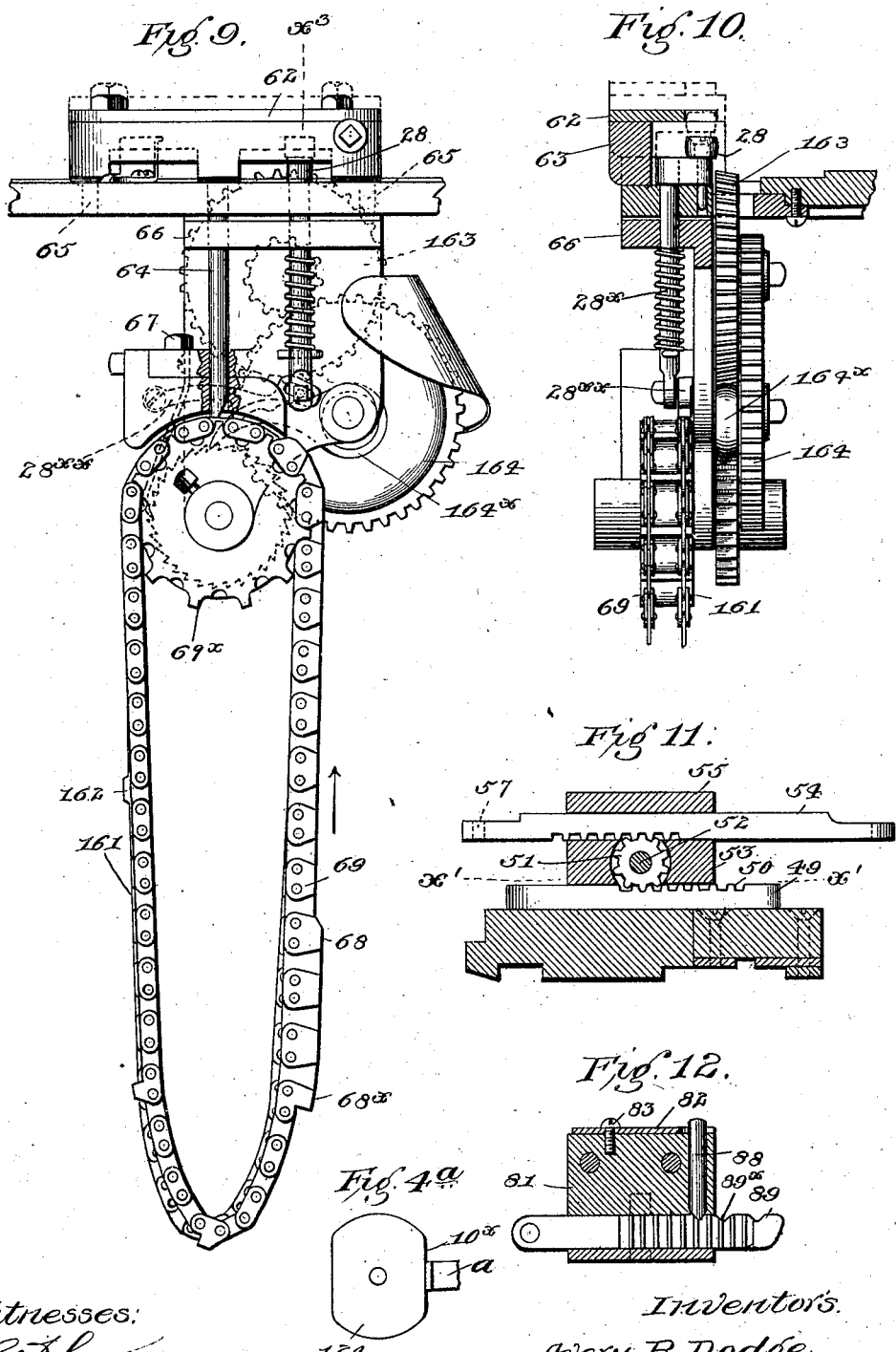

No. 720,514. PATENTED FEB. 10, 1903.
A. B. DODGE & J. H. RICE.
KNITTING MACHINE.
APPLICATION FILED DEC. 4, 1900.
NO MODEL. 6 SHEETS—SHEET 6.
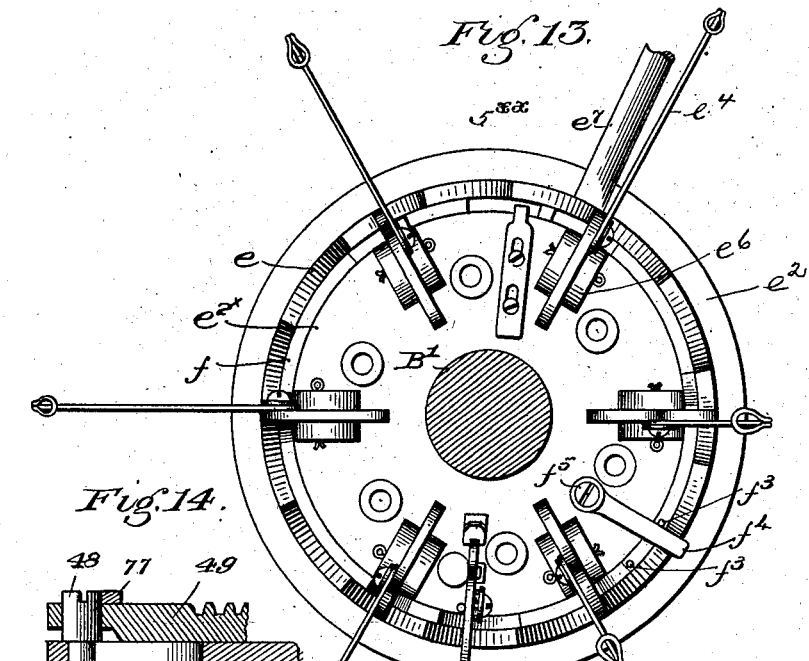
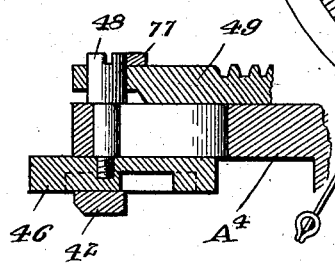
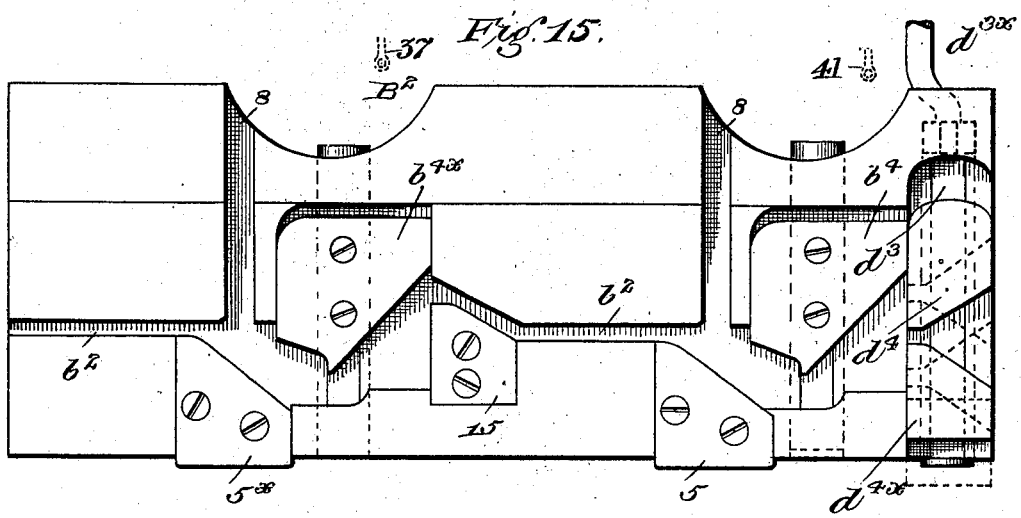
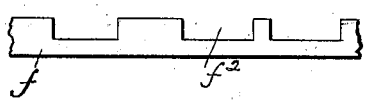
Witnesses:
J. C. Shaw
E. F. Allen
Inventors.
Avery B. Dodge.
John H. Rice.
by Crosby & Gregory
Atty's

UNITED STATES PATENT OFFICE.

AVERY B. DODGE AND JOHN H. RICE, OF MANCHESTER, NEW HAMPSHIRE, ASSIGNORS TO LEIGHTON MACHINE COMPANY, OF MANCHESTER, NEW HAMPSHIRE.

KNITTING-MACHINE.

SPECIFICATION forming part of Letters Patent No. 720,514, dated February 10, 1903.

Application filed December 4, 1900. Serial No. 38,603. (No model.)

*To all whom it may concern:*

Be it known that we, AVERY B. DODGE and JOHN H. RICE, citizens of the United States, and residents of Manchester, county of Hillsboro, State of New Hampshire, have invented an Improvement in Knitting-Machines, of which the following description, in connection with the accompanying drawings, is a specification, like characters on the drawings representing like parts.

In the machine to be herein described the needle-cylinder and the grooved dial-needle bed and the needles contained in said cylinder and bed are and may be of usual construction; but the cams carried by the dial-needle plate and the cams for actuating the cylinder-needles are of novel construction—that is, each is provided with a switch, said switches when in their operative position enabling the machine in the rotation of its moving parts to knit rib-stitch and when in their inoperative position enabling a welt to be knitted in plain stitch, said welt presenting two separated walls, the said walls being knitted—one, it may be, by a thread used in the production of rib-knitting and the other by a thread used in the production of rib-knitting or a thread differing therefrom in color or material—said walls being knitted course after course in succession, one by the cylinder-needles and the other by the dial-needles.

The machine herein to be described is an improvement upon the class of machine in which the dial-cam plate and the cams for moving the cylinder-needles are so constructed that the needles take but one thread during each rotation of the knitting parts.

The machine to be herein described contains, however, a plurality of main thread-guides which may be arranged in pairs, and the needles when the machine is in operation for rib-knitting take threads at different points in each rotation, thereby increasing the product.

The employment of a plurality of thread-guides and locating them at different points is essential in the machine herein to be described, for the reason that when the welt to be hereinafter described is being knitted one thread-guide must act to feed thread to but one set of needles and the other to feed thread only to the other set of needles, the knitting of said threads resulting in forming separate courses of loops to constitute two distinct walls of the welt, both walls being knitted simultaneously.

Heretofore welts have commonly been knitted on the needles of a rib-knitting machine by temporarily discontinuing the action of one set of needles, putting them out of action, yet permitting them to hold their loops, and a few courses of knitting have been effected on the one set of needles, the loops of the last course of the welt being incorporated with the loops held on the shanks of the needles which were temporarily put out of action; but with one set of needles only knitting a welt it has been impossible to take care of a knitted welt composed of any great number of courses, and consequently the length of the welt has been limited; but by the invention to be herein described, wherein each set of needles acts in the production of the welt to form simultaneously each one-half of the welt, making a welt of two walls, all limitations as to the length of the welt are overcome.

In knitting a welt having two like walls the cylinder-needles and the dial-needles take each its own thread and knit simultaneously each its own course in one of the walls of the welt, these courses being knitted at a point one behind the other, the length of the welt being determined by the number of courses put into each wall of the welt, it being possible to make a welt of any width and merge the single wales thereof into the wales of the connected rib-knitted body.

During welt-knitting the switches are in their inoperative positions to thereby prevent the thread being presented to the cylinder-needles by one of said thread-guides from being caught by the dial-needles, and, vice versa, that each set of needles may take only its own proper thread in the formation of the two like walls of the welt, the change of position of said switches putting them into their operative positions when the welt has been knitted of the proper length.

The cam-cylinder of the machine to be herein described is provided with devices under the control of a suitable pattern chain or surface to actuate a switch composed of a plunger having attached cams, said switch occupying three different positions, its upward or operative position being that occupied by it when rib-knitting is being done, its lowest or inoperative position being that occupied by it when welt-knitting is being done, and its intermediate or third position being one wherein said switch prevents upward movement of the cylinder-needles sufficiently far to cast their loops over their latches, allowing them, however, to take the thread from one of the two thread-guides used in the rib-stitch knitting.

The provision for enabling the cylinder-needles to hold their loops and take one of the threads results in the production of what is called "royal" rib or tuck stitch, which is well understood by those skilled in the art.

We have stated that we employ a plurality of main thread-guides, and we may employ any desired number of main thread-guides, that depending upon the size of the machine and the rapidity with which it is desired to knit, it being understood that the greater the number of main thread-guides properly located to operate in succession the faster the web may be knitted, and with a machine having a large number of main thread-guides it will be understood that when such machine is employed to knit welts alternate thread-guides will operate to feed the cylinder-needles, the other or intermediate thread-guides operating to feed the dial-needles.

If a welt is to be knitted using only the main threads employed in the rib-knitting, then alternate thread-guides will feed thread to one set of needles for knitting course after course in one wall of the welt, while the remaining thread-guides will feed thread to the other set of needles to enable the knitting simultaneously course after course of the second wall of the welt.

The thread-guides may be arranged in pairs, so that should it be desired to knit a welt one wall of which—say the outer wall—is to be composed of a thread differing in color or material from that used in rib-knitting the thread-guide containing the thread used in rib-knitting may be provided, through thread-changing means to be described, with a thread of the desired color or material, it being fed, as herein shown, to the dial-needles, such needles being herein used exclusively in knitting the outer wall of the welt.

The welt produced as herein provided for is commenced by knitting a course preferably from one of the two threads used in rib-knitting, said course being herein designated as a "welt-starting" course, it being held by both needles; but the second course coming into the welt and following the starting-course knitted on both sets of needles is composed of two threads, one for each branch of the welt, one of which is a main thread which was engaged by both sets of needles in the starting-course; but the second thread to be introduced in the second course for knitting the welt may be the other main thread or a new thread not used in the body of the fabric when knitting the rib-stitch, and said new thread may differ in color or material, and said two threads will be knitted separately each in its own course, each thread forming one wall of the welt to be made.

In the method herein set forth for producing a tubular web presenting welt-sections and capable of being subdivided into cuffs or ribbed tops for terminating a part of a knitted garment it will be supposed that the main body of the web or the portions thereof to form the body of the cuff or top are knitted in rib-stitch, that one end of said body will preferably be terminated by one or more courses of royal rib or tuck stitch, and that said web will have following the tuck-stitch a dividing course of longer stitches, said dividing course presenting loops at which to separate the cuffs or tops from each other, that they may be used in connection with other garments.

The dividing course connected with a royal rib or tuck course has built upon it the welt-starting course hereinbefore referred to, and the welt having been knitted of the proper length the two walls of the plain-stitch welt will have their wales merged into wales of rib-knitting produced by putting the switches hereinbefore referred to into their operative position.

When the fabric containing the series of knitted tops or cuffs is separated by withdrawing the dividing course, each cuff or top so formed will present at one end a tubular welt composed of two walls of equal length each composed of a separate thread, and the opposite end of the cuff or top will present defined loops, preferably forming part of royal rib or tuck stitch knitted courses, and said loops may be picked upon any usual transferring device or upon needles of a circular-knitting machine or upon stitch-holding pins or any usual looping mechanism in order that said cuff or top may have knitted to it a leg or other parts of a stocking or may have stitched to it a leg, arm, or any other part of a knitted garment.

Figure 2:
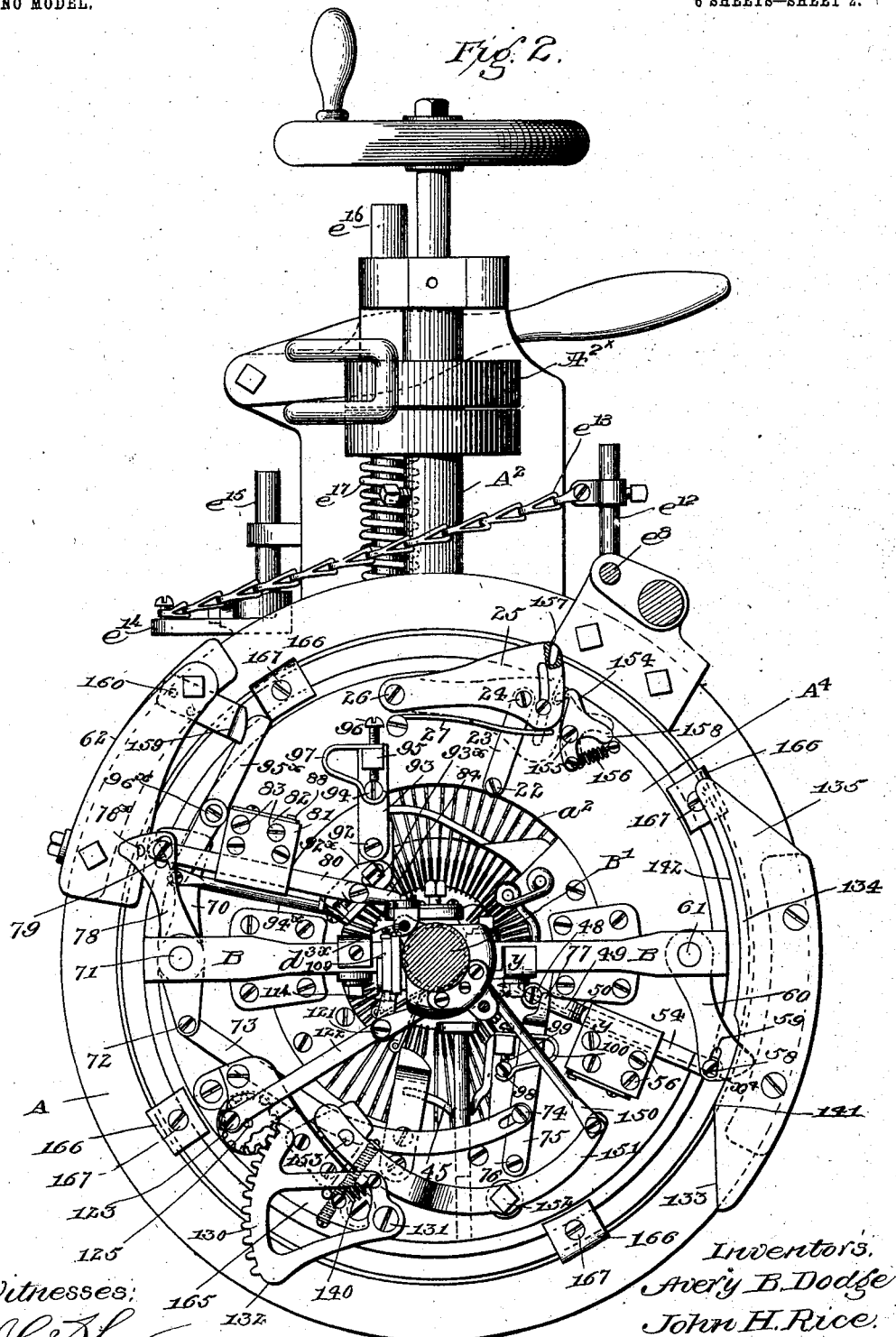
Figure 3:
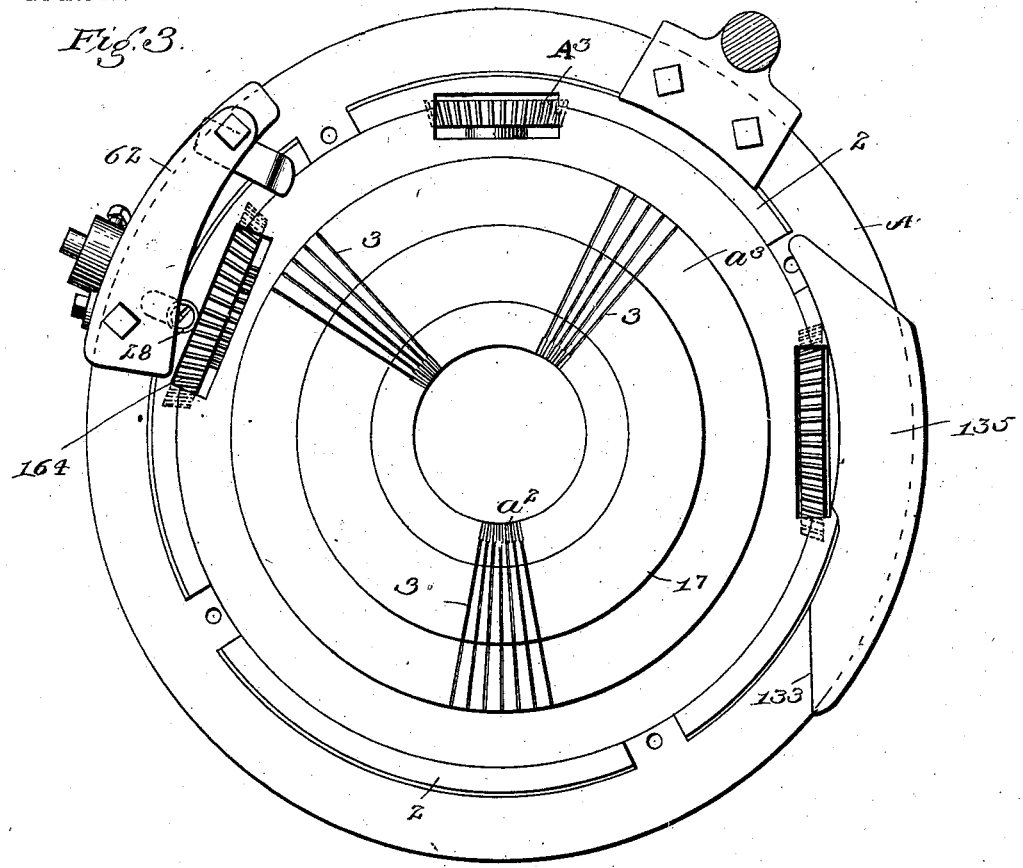
Figure 4:
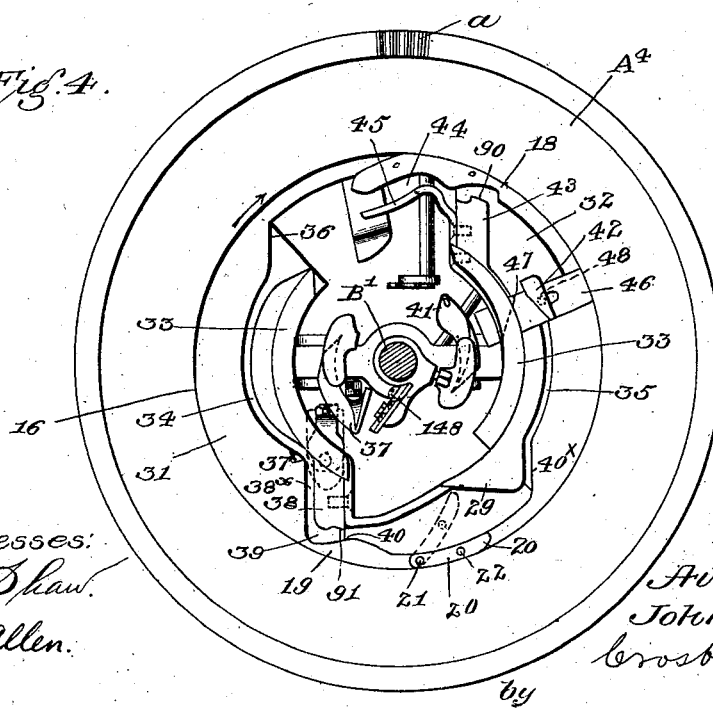

Figure 1 is a front view showing the main operative parts of a knitting-machine embodying our invention, some of the upper structure of the machine, containing the thread eyes and guides being omitted, the foot of the column also being omitted. Fig. 2 is a plan view of the parts represented in Fig. 1 below the dotted line $x$. Fig. 3 is a detail showing in plan view the dial-plate with some of its grooves to contain the dial-needles. Fig. 4 is an under side view of the dial-cam. Fig. 4$^a$ is a detail of a part of the thread-changing mechanism. Fig. 5 is an enlarged detail chiefly to show the means for changing the positions of the thread-guides and especially the thread-guides employed in welt-knitting when one of the threads of the welt is to be of a different color or material. Fig. 6 is a detail of devices for raising and lowering the thread-guides. Figs. 7 and 8 are further details relating to the thread-changing means. Fig. 9 is a detail view taken from the left hand of Fig. 1, chiefly to show the two pattern-chains employed to control the switch-cams referred to to put either the cylinder-needles or the dial-needles into their inoperative positions for welt-knitting and also to so control the movements of the needles that a royal rib or cardigan stitch may be made and also that the dial-needles may be put into position to discharge their stitches for one course and to enable a separating course to be knitted on the cylinder-needles. Fig. 10 is a section in the line $x^3$, Fig. 9. Fig. 11 is a section in the line $x^4$ of Fig. 2. Fig. 12 is a horizontal sectional detail of the block 81, to be described. Fig. 13 is a detail showing the means employed for controlling the stopping of the machine on the breakage of a thread; Fig. 13$^a$, a detail of the ring $f$. Fig. 14 is a section in the line $y\,y$, Fig. 2. Fig. 15 shows the cam hub or cylinder for actuating the cylinder-needles, the same being laid out flat to better display the operating-cams.

Referring to the drawings, A represents the bed of the machine, it being secured by suitable set-screws $A^\times$ to a head $A'^\times$, (see Fig. 1,) sustained by suitable bolts $A^{2\times}$ upon a column or stand $A^{3\times}$, supposed to rest upon the floor. The head $A'^\times$ has a suitable bearing for the main shaft $A^2$, Fig. 2, herein represented as provided with a suitable hand-wheel and with usual fast and loose pulleys, the fast pulley receiving upon it a belt driven from any usual counter-shaft to rotate the shaft $A^2$ and the bevel-gear $A^3$, (shown partially in full lines in Fig. 3 and by dotted lines in Fig. 1,) it engaging suitable teeth $a$, connected with the dial-cam plate $A^4$, (see Fig. 2,) and inverted in Fig. 4, said dial-cam plate carrying cams and switches to be described.

The bed A (see Fig. 3) at a short distance from its edge has a circular rim 2, within which is laid and sustained the dial-needle bed $a^3$, it having suitable grooves 3, some of which are shown in Fig. 3, to receive a series of dial-needles $a^2$.

The needle-cylinder $B^3$, Fig. 1, has at its outer side at opposite points suitable ears $b^{3\times}$ to receive lugs $b^{14}$, held by screws $A^{\times 2}$, said ears and lugs restraining the rotation of said needle-cylinder in the operation of the machine, the needle-cylinder having the usual series of grooves to receive the vertical or cylinder needles which coöperate with the dial-needles $a^2$.

The cam-hub $B^2$ (see Fig. 16) is connected by spline $2^\times$ to the spindle $B'$, which extends upwardly through the yoke B, the upper end of the spindle receiving over it the hub 4, depending from the spool-carrying stand $5^{\times\times}$, Fig. 1.

The needle-cylinder is maintained in its operative position by or through a suitable washer $b^8$, surrounding the spindle $B'$ and resting loosely upon a collar $b^7$, secured to said spindle by a set-screw $b^{10}$.

Referring to Fig. 16, showing the hub $B^2$ laid out as described, it will be seen that the cams are duplicated, so that the cylinder-needles are actuated to take thread and make stitches twice during each rotation of the cam-hub, and said hub has two like drawing-down cams $b^4$ and $b^{4\times}$, the cam $b^4$ acting first in the rotation of the hub, it rotating in unison with the dial-cam plate to be described.

The hub $B^2$ is provided with two like rising cams 5 and $5^\times$, the one, 5, raising the needles depressed by the drawing-down cam $b^4$, while the cam $5^\times$ acts upon the butts of and raises the needles depressed by the drawing-down cam $b^{4\times}$.

The cam-hub $B^2$ has a groove $b^2$, in which travel the butts of the needles which are acted upon by the drawing-down and the lifting cams, as will be understood.

The cam-hub $B^2$ has two vertical grooves 8 for the insertion and removal of needles when desired, and it has another vertical groove which receives a plunger $d^3$, provided with two cams $d^4$ and $d^{4\times}$, constituting a switch and attached to the plunger by suitable screws, the upper end of the plunger being connected with a rod $d^{3\times}$, (shown in section in Fig. 2 and in detail in Fig. 5,) the end of said rod having secured to it by a set-screw 9 a block 10, said block having connected with it at one side thereof, by a suitable screw 12, a link 13, jointed to one arm of a lever 14 (shown in Fig. 5) and having its fulcrum on a stud-screw $15^\times$, entering the yoke B.

By contrivances to be hereinafter described the lever 14 will be turned to move the plunger $d^3$ in its groove according to the work to be done on the machine. When the plunger occupies the position represented in Fig. 16, its intermediate position, the cams $d^4$ and $d^{4\times}$ occupy the full-line position and will not do any work, but will permit the said cams to cross the butts of the needles in advance of the approaching drawing-down cam $b^4$, the cams $d^4$ and $d^{4\times}$ not moving the needles, the machine at such time knitting what is hereinafter designated as the "royal rib-stitch." When the plunger is in a position to put the cams $d^4$ and $d^{4\times}$ in the upper dotted line or raised position, Fig. 16, plain rib-knitting will be done; but when the said cams are completely lowered, carrying the faces of the cams $d^4$ and $d^{4\times}$ into their most depressed position, (represented by the lower dotted lines,) then the cams will operate upon the butts of the cylinder-needles to put them out of position when the welt hereinbefore referred to is being knitted, the plunger occupying this depressed position from the time that the first courses to be laid in the two walls of the welt are started until the welt is finished and made of the proper length.

In the operation of the machine the cams 5 and $5^\times$, acting on the butts of the needles, lift them only far enough to leave the loops on the latches of the needles near their ends; but as soon as the butts of the needles so partially lifted meet the cam 15 that cam acts to further lift the needles in order that the latches enveloped by the loops may rise through the loops, so that as the needles are thereafter depressed by the cam $b^{4\times}$ the needles will act to knit. When in its elevated dotted-line position and rib-knitting is being done, the cam $d^{4\times}$ performs also the function of the cam 15, referred to, lifting the butts of the needles being approached by the drawing-down cam $b^4$, so that the latter cam will move the needles to knit. When, however, a royal rib or tuck stitch is being made, both series of needles operating, the cams $d^4$ and $d^{4\times}$ occupy their full-line position, so that the needles passing between the faces of the cams $d^4$ $d^{4\times}$ and being approached by the drawing-down cam $b^4$ are not lifted high enough to put the loops about their shanks, and consequently the needles acted upon by the drawing-down cam $b^4$ do not knit, but such needles receive loops in their hooks, and on being passed by the cam 15 and the drawing-down cam $b^{4\times}$ the needles are elevated and depressed to knit, and controlling two loops rather than one loop of thread act to produce the royal-rib stitch. When, however, a welt is to be knitted, the cams $d^4$ and $d^{4\times}$ being then in their extreme lower position, thereby putting their acting faces below the full-line positions designated in Fig. 16, then the needles being approached by the cam $b^4$ are acted upon by the edge of the cam $d^4$ and are put into their lowest position, so that they cannot take loops from the thread-guide which supplied them, say, with a second thread when knitting royal rib, and consequently during welting the cylinder-needles are raised to take thread and are depressed to knit said thread only by the cam 15 and $b^{4\times}$, so that said cylinder-needles when passing one of the pair of thread-guides which supply both sets of needles in rib-knitting now take thread from but one of said thread-guides.

The dial-needles in the form of machine shown knit centrally of the dial, although, of course, the invention is not limited in this respect, and referring to Fig. 4, showing the under side of the dial-cam plate $A^4$, the under side of the plate is cut away centrally to leave a shoulder 16 to embrace the circular shoulder 17, rising from the dial-needle bed $A^3$, (see Fig. 3,) and inside said shoulder 16 the dial-cam plate has attached cam-faced easing-blocks 18 and 19, which, as herein shown, act to throw the dial-needles partially toward the center of rotation of the dial-cam plate to relieve the strain on the stitches after the needles have been drawn outwardly in the knitting operation. Said cam also has a movable running-off cam 20, pivoted at 21, said cam being operated automatically in the operation of the machine by or through a pin 22, extended upwardly from said running-off cam to a point above the upper face of the dial-cam plate, where said pin 22 (see Fig. 2) has connected with it a link 23, jointed at its opposite end by a screw 24 to a lever 25, pivoted at 26 on the top of the dial-cam ring. The lever 25 is acted upon by a spring 27, said spring normally keeping said lever 25 in its full-line position, Fig. 2, retaining the running-off cam 20 in its inoperative position; but whenever in the operation of the machine a separating course is to be inserted in the knitting for dividing the work and also preparatory to starting knitting a welt said lever 25 is acted upon by a roller 28, carried by a spring-pressed pin $28^\times$, connected to a pawl $28^{\times\times}$, which is acted upon by a suitable riser on the pattern-chain 161, (see Figs. 3, 9, and 10,) which moves said lever and puts the running-off cam 20 in its dotted-line position, Fig. 4, and said running-off cam in its abnormal position acts upon the butts of the needles leaving the easing-block 19, moving said needles in far enough to shift their latches through the loops, so that the dial-needles not having taken a thread cast off their loops when acted on by cam 29, leaving a series of loops made only by the cylinder-needles, such course of loops made solely by the cylinder-needles constituting the dividing course and also, as stated, the course made preparatory to starting the two-walled welt. Within the rim 16 of the dial-cam plate are suitable cam-carrying blocks 31 and 32. Each of these blocks has a similar projection 33 near its inner edge to constitute a guard to act upon the upper sides of the dial-plate needles and keep them properly seated in the grooves of the dial-needle bed. Outside these guards each block presents a suitable groove, as 34 and 35, so that the first block to act—viz., block 31—having at its entrance or mouth a cam-surface, as 36, acts upon the butts of the needles to put them into the groove 34, so shaped (see Fig. 4) that when the butts of the needles arrive at the point $37^\times$ the needles will have been pushed forward far enough to take thread from the thread-guide 37, and having taken thread the part $38^\times$ of the cam-groove immediately acts to move the dial-needles outwardly until on the arrival of the butts of the needles in the part 39 of the grooves, the needles having been fully drawn out, drawing the thread taken from the thread-guide 37 between the cylinder-needles and through the loops on their own shanks, the cam-face 40 of the easing-block 19 acts upon the butts of the needles to move them slightly inwardly to relieve the strain on the loops held by them. In the further movement of the dial-cam plate, supposing the machine to be knitting the rib-stitch, the butts of the needles contact with the incline 40$^\times$, leading into the groove 35 of the block 32, starting the needles inwardly, that they may take thread from the thread-guide 41, said needles in said groove 35 meeting the throwing-in cam 42, which completes the inward movement of the dial-needles, that they may take thread from the thread-guide 41, and thereafter the butts of said needles meet the inclined edge of the drawing-out cam 43, which moves the needles outwardly, they having taken loops, drawing the new loops taken by them between the cylinder-needles and through their own loops, and thereafter the butts of the needles meet the second easing-cam 18, which, as before stated, removes the strain on the thread, the butts of the needles traveling thence through the space 44, forming part of said easing-cam, the latter cam having a coöperating wall 45, which prevents the needles from being moved farther than would be the case by the action only of the easing-cam, the needles leaving the space 44 again contacting with the cam edge 36. The cams referred to occupy the position shown by full lines in Fig. 4 whenever rib-knitting is being done. The cam 42 is carried by a slide 46, provided with a second cam projection 47, (see the detail Fig. 4,) constituting a switching-out cam, movable whenever a welt having a double wall, as herein referred to, is to be knitted.

To knit the welt referred to, the slide 46 is moved outwardly, putting the cam 42 in its inoperative position and causing the projection 47 to meet the inner sides of the butts of and pull the needles outwardly before they arrive in position to take thread from the thread-carrier 41, which prevents the dial-needles in the rotation of the dial-cam during the knitting of a welt from taking thread from the thread-guide 41, so that, as described, there is presented an organization wherein in welting the cylinder-needles used for making the inner wall of the welt take the main thread only from the thread-guide 41 and the dial-needles used for knitting the outer wall of the welt take a main thread or a substitute for it only from the thread-guide 37, that depending upon whether or not the outer wall of the welt is to be formed from one of the threads used in knitting the rib-stitch or whether the outer wall of the welt is to be formed from a thread of a different color or material to thereby constitute an ornamentation for the welt.

To move the slide 46 at the proper time preparatory to welting, said slide is provided with a stud 48, which is extended upwardly (see Fig. 2) and embraced by a link 49, having at its upper side suitable teeth 50, (see Fig. 11,) which are engaged by a pinion 51, mounted on a stud 52, held in a block 53, said block being grooved below said pinion to enable the link 49 to slide therein and being also grooved above said pinion to receive an actuator 54, which is acted upon at its upper side by a suitable cover 55, held in place by suitable set-screws 56 to thereby cause teeth at the under side of the actuator 54 to maintain their engagement constantly with the teeth of the pinion 51. The actuator 54 has at its outer end (see Fig. 11) a suitable hole 57, which receives a stud 58, which enters loosely a slot 59 in a lever 60, pivoted on a stud 61, carried, as represented, by the yoke B.

In the movements of the machine preparatory to knitting the course to form the two walls of the welt the slide 46, just referred to, is put into its outer or inoperative position by the contact of the lever 60 against the cam 62, Figs. 2 and 9, carried by a block 63, having a stem 64, which is extended through a hole in the bed A, suitable like guiding-pins 65, also preferably connected with the block, entering holes in the bed, so that the said cam may be prevented from twisting or turning under the action of the lever 60. The stem 64 is also guided at two points in a suitable bracket 66, Figs. 9 and 10, connected by bolts 67 with the bed A, the lower end of said rod being acted upon by the highest links 68 of the indicating-chain 69 whenever the slide referred to is to be put into its inoperative position, said chain, as herein represented, having four such highest links; but a greater or less number of such highest links may be employed, according to the length of the welt to be knitted, each of said highest links making, let it be supposed, three courses of plain knitting for both the inside and outside walls of the welt. The welt having been made of the desired length, the last one 68$^\times$ of the highest links 68 passes from under the stem 64 and lets the cam 62 drop into its lowest position, in which position it is struck by the returning lever 70, Fig. 2, mounted upon a stud 71, carried by the yoke B, the opposite end of said lever being jointed by a pin 72 to a curved link 73, slotted at its end and embracing loosely a stud 74, carried by a lever 75, pivoted at 76, the free end of said lever (see Fig. 2) having a finger 77, which acts against the stud 48 and moves the link 49 inwardly, thereby returning the slide 46 and cam 42 into normal position for rib-knitting.

While the machine was being actuated for welting, with the cam 42 of the slide 46 in its inoperative position, the plunger $d^3$, with its cams $d^4$ and $d^{4\times}$, constituting the switch, was depressed to occupy its lowest position to thereby put the cylinder-needles into such relation to the thread-guide 37 that it will not take thread from said guide, said cylinder-needles taking thread only from the guide 41, and this depressed position for the switch is gained automatically by the lever 78, having as its fulcrum the stud 71, it meeting the cam 62 when in its highest position under the action of the high link 68, the lever 78 meeting the said cam by half a rotation of the dial-cam in advance of the lever 60 meeting said cam. When the lever 78 meets the cam 62, the free end of said lever is moved inwardly, causing said lever connected loosely with a stud 79 of a slide 80 to move said slide inwardly in the block 81, (see Figs. 2 and 12,) having a cover 82, held in place by screws 83, causing said slide through a link 84, (shown in Fig. 2 and in Fig. 5,) jointed by a screw-stud 86 with the lever 14, hereinbefore referred to, to turn said lever, that it through the link 13, connected with the rod $d^{3\times}$, may depress the stem and cams constituting the switch for the cylinder-needles into their inoperative position. The welt having been completed and the knitting to follow being the rib-stitch, the plunger $d^3$, with its cams $d^4$ and $d^{4\times}$, is put into its most elevated position by the action of the lever 70, before described, on the cam 62 in its lowered position, said lever being connected with a toothed rack 89, having notches $89^\times$ in its side to be engaged by a friction-bolt 88, said rack being free to slide in a suitable groove in the block 81, it engaging a suitable pinion, like the pinion 51, referred to and represented in Fig. 11, said pinion engaging suitable teeth upon the lower side of the bar 80, the pinion acting to move the bar 80 in a direction to turn the lever 14 to elevate the plunger forming part of the switch referred to.

Referring now to Fig. 4, the length of stitch is regulated by adjusting the blocks presenting the faces 43 and 38, thereby putting their ends 90 91 in position farther from the center of motion of the dial-cam. These blocks have connected with them suitable studs, and one of them—viz., the block 38—has extended upwardly from it through the block 31 a stud 92, (see Fig. 2,) embraced by a link 93, which engages a stud 94, erected on the dial-cam carrier, said link also having a projection 95, which receives through it an adjusting-screw 96, which may be turned, that the inner end of said screw acting against the stud 94 and moving the cam 38 outwardly may lengthen the stitch, a suitable spring, as 97, acting normally to keep the screw 96 against the stud 94 and to move the cam 38 inwardly in a direction to shorten the stitch. If desired, the cam 38 may be adjusted to lengthen or shorten the stitch by means of a pivoted arm $92^\times$, Fig. 2, having a cam end acting upon the link 93, the opposite end of said arm being connected to a rod $94^\times$, jointed to one end of a swing-lever $95^\times$, pivoted at $96^\times$ and having its end in position to be struck by the cam 62 or outer pattern-controlled means when the length of stitch is to be changed. The cam 43 has provisions for adjusting it in a similar manner; but to effect this adjustment the link 93 is done away with and a stud 98, extended upwardly from said cam through a slot in the block 32, is acted upon by a screw 99, (shown in Fig. 2,) a suitable spring 100 coöperating to keep the stud against the screw.

Viewing Figs. 4 and 5, they show the thread-guides 41 and 37, before referred to, each of which supplies one of the main threads during rib-knitting, and it has been stated that provision is made in the machine for substituting a thread for one of the main knitting-threads to be taken by the dial-needles, if desired, as when knitting the welt, that the outer wall of the welt may show a thread differing in color or material.

During the knitting of the welt the thread-guide 41 will continue to present its thread to the cylinder-needles, and said thread will be knitted to form the inner wall of the welt, and if the outer wall of the welt is to be knitted from a thread used in the rib-stitch knitting then the thread-guide 37 will present to the dial-needles only the thread which it presented to both sets of needles during rib-knitting, and the said dial-needles will form a fabric for the outer wall of the welt. If the outer wall of the welt is to differ, however, in color or material from the inner wall thereof, then the thread will be changed at the guide 37, and to do this we have provided thread-changing means located at that guide. Said thread-changing means, as herein shown, includes two fingers 101 and 103, and during rib-knitting and while knitting the welt, provided the thread used in the outer wall of the welt is to be the one employed in rib-knitting, the finger 101 will continue to supply the guide 37 with thread. If the thread is to be changed for another of a different color or material, then the finger 103 will be put into position to supply the guide 37 with thread and the finger 101 will be put into its inoperative position. Whichever of these two fingers is to present thread to said guide 37 to be taken by the needles must occupy a position above the under side of said thread-guide in order that the thread led from it may be taken by the needles, the other of said fingers, or the one not presenting thread during rib-knitting, occupying a position below the under side of said thread-guide 37, so that the thread coming from it cannot be taken by the dial-needles.

Fig. 5 shows the finger 103 depressed in its inoperative position, it standing with its eye below the under side of the yarn-guide 37, connected by a bolt 107 with the yoke B, said yoke being adjustable as to its position vertically by a screw 108, so that said thread-guide 37 may occupy exactly the proper position with relation to the dial-needles.

In case, as may at times be preferred, it should be desired to use a thread of a different color or material in the outer wall of the welt then such change of threads may be effected by changing the position of the fingers, so that the finger 103 will supply thread to said thread-guide 37. Each of the fingers 101 and 103 is mounted upon a like lever 109, one of which is shown distinctly in Fig. 6, each lever being mounted on a pivot, as 110, each lever having a downturned heel 112, which contacts with the face 113 of a thread-changing actuator, shown as an oscillating lever 114, provided with a fulcrum 115, which enters loosely a suitable hole in a block 116, connected by a screw 117 with one side of the yoke B. Each lever 109 is acted upon by a suitable spring 118, which serves normally to lift the finger and put it into its operative position. When the heels 112 of each lever contact with the face 113 of the thread-changing actuator, the said face standing at right angles to the longitudinal axis of the bolt 117, then both levers and their attached fingers carrying threads will occupy their elevated positions, as in Fig. 6, and both threads will be fed to the needles, said levers occupying this position while the needles pass the thread-guide 37 to knit two or more stitches, so that the thread coming into the fabric may be caught in the fabric by the needles before the thread to be omitted is cut off.

The thread-changing actuator (see Fig. 8) occupies its position farthest in the direction of the arrow when the finger 101 is supplying the thread-guide 37 with thread for rib-knitting or for the outer side of the welt; but whenever the actuator occupies its extreme position in opposition to the direction of the arrow, Fig. 8, then the finger 103, controlling the thread of different color or material, will be elevated in position to deliver its thread to said thread-guide, and the finger 101 will be depressed, so that its hole 102 occupies a position below the under side of said thread-guide. To move this thread-changing actuator, we have inserted in a threaded hole 120 thereof (see Fig. 6) a stud-screw 121, it entering a link 122, in turn connected with a stud-screw 123 on a disk 124, carried at the upper end of a shaft 125, mounted in a bearing 126 and provided at its lower end with a pinion 127, it also constituting a pawl-carrier and being provided with suitable bolts 128, which engage the notches or teeth 129, cut in the shaft 125, so that as said pinion or pawl-carrier is moved in one direction—viz., that of the arrow near it in Fig. 7—the shaft 125 will be rotated one step or half-way around to move the thread-changing actuator from one to its other extreme. The pinion or pawl-carrier derives its movement in one and then in the other direction by means of a segment 130, pivoted at 131 and actuated to turn the pinion in its operative stroke by means of the corner 132 of said segment meeting the face 133 of the cam 134, attached to a suitable block 135, said block having a stem 136, which is extended through the head, and a suitable stand 137, suitably connected therewith, the lower end of said stem resting upon the pattern-chain 138, (shown in Fig. 1,) it having, as herein provided for, the usual high links located distant from each other according to the number of courses it is desired to put into each wall of the welt, one of the said projections acting to lift the cam referred to and put it in position to be struck by the sector, the other of said projections again lifting the cam temporarily, that the sector may again strike it to impart another step movement to the pinion or pawl-carrier to move the thread-changing actuator from one to its other extreme, it being understood that the sector is returned immediately into its normal or outward position as soon as the cam is lowered by passing one of the high links 139 by a suitable spring, as 140.

To prevent the thread-changing actuator from being moved too far, due to momentum of the parts, we have slabbed off two sides of the disk referred to (see Fig. 4$^a$) and have provided a suitable yielding abutment $a^{10\times}$ to meet said slabbed surfaces.

The acting face of the cam 134 is of such shape that the sector 130 is moved when a change of thread is to be effected, not fully at first, but only partially, by the incline 133, the end 132 of said sector when traveling over the curved surface 141 being retained temporarily in position just for a period long enough to enable the finger which is being brought into its operative position to stand momentarily in line with the finger at that time used to feed the thread-guide 37, so that the incoming thread and the thread to be put out of operative position may both be fed to two or more needles before the end of the sector meets the curved surface 142 of the cam 134, which effects fully the change of position of the thread-fingers. This putting into operative position temporarily of both of the fingers that each may present its thread to two or more needles is also practiced when the thread of different color or material used for making the outside wall of the welt is to be thrown out of operation in order that the regular thread-finger 101 may come into operation, the provision of enabling two or more needles to take both threads obviating the formation of holes in the fabric, which would otherwise result by changing the threads.

It will be obvious that when one thread is put into operative position and another thread is put into inoperative position the outgoing thread must be cut off, and to do this we have herein provided a thread-cutting means, which we will now describe. This thread-cutting means (see Fig. 5) is represented by a movable blade 143, mounted to turn about a pivot 144, held in a block 145, connected by a set-screw 146 with the spindle B', the opposing member of the cutting device being a stationary blade 147, also connected with said block by a suitable screw 148. (See Fig. 4.) The movable blade has a projection or screw-stud 149, which is engaged by the end of a link 150, Fig. 2, connected at one end with the end of a lever 151, mounted upon a stud 152, and provided at its opposite end with a projection 153, which at each inward movement of the sector to move the thread-changing actuator from one to its other position is actuated to cut the outgoing thread after the incoming thread has been caught into the fabric by two or more needles. The lever 25 has coöperating with it a locking device 154, (shown as a three-armed lever,) pivoted at 155 and acted upon by a spring 156, which tends normally to keep the projection at the end of said lever nearest the outer edge of the dial-cam carrier pressed against the curved end of the lever 25, so that whenever said lever 25 is moved inwardly, as has been stated, to put the running-off cam 20 into its operative position said locking device will engage a suitable projection 157, (shown best by breaking away a part of said lever in Fig. 2,) thus temporarily holding the running-off cam in position while the dial-cam carrier makes nearly a full rotation, the arm 158 of said locking device at such time occupying the dotted-line position, Fig. 2, it striking the unlocking projection 159, represented as connected with the bed by suitable screws 160. The chain 161, located behind the chain 69, has, as herein shown, but one high link 162, it acting once in the rotation of said chain to lift the roll 28 instantaneously just before the action of the high links 68 to commence the knitting of a welt, said high link 162 being so located on the chain that it operates only when the dividing course hereinbefore referred to is to be knitted on the cylinder-needles, the thread at such times being left on the cylinder-needles, while the thread fed to the dial-needles is discharged without being knitted into loops.

The belt-shifting means herein shown is not described because old and in common use.

The pattern-chains referred to are each hung on a suitable sprocket-wheel $69^\times$ and $161^\times$, which are moved at the proper speed by or through the pawl $164^\times$, having eccentric connection with suitable gearing, the chief gears of the train—viz., gears 163 and 164—deriving their movement by engagement with the teeth $a$ at the under side of the dial-cam carrier.

The yoke B is secured to the dial-cam plate by suitable screws, and the sector 130 and the bearing for the shaft 125 are sustained upon a suitable plate 165, held in suitable position above the dial-cam carrier. The dial-cam plate is maintained seated in this position on the bed by means of suitable lugs 166, through which are extended suitable screws 167, all as usual.

Before describing the operation of the machine hereinbefore referred to in detail we will state that royal rib or tuck stitch differs from rib-knitting only that in rib-knitting the cylinder-needles after receiving a thread are actuated to knit before receiving another thread, whereas in royal rib or tuck the hooks of the cylinder-needles are provided with two threads before the needles are depressed to knit.

Assuming that the main body of the cuff, top, or other finish for the garment or thing being knitted is knitted in rib-stitch, we will state that the rib-knitting at that end of the cuff or top which is to be joined with the stocking or other underwear will preferably present royal rib or tuck stitch following rib-stitch, and the last course of royal rib or tuck stitch when the dividing course is removed to separate a series of completed cuffs or tops having welts will be left in condition to be picked onto any usual needles of a circular-knitting machine or to be picked onto any usual quills or points to hold said loops while the end of the cuff or top is being stitched to the end of the garment for which the cuff or top is to form a finish. For instance, the cuff or top herein to be described may be put by a transferrer or otherwise upon the needles of a circular-knitting machine and have the leg, heel, foot, and stocking knitted to it or the cuff or top herein described may be seamed upon the ends of sleeves, legs, or other parts of underwear.

The cuff or top herein described is knitted in series in a connected fabric, and the royal-rib knitting having been carried on for the desired number of courses, the cuff or top being of the desired length, the running-off cam 42 is put into its operative position, causing the thread being fed in making the last course of royal rib to be discharged from the dial-needles, leaving such needles empty and leaving the loops only on the cylinder-needles.

The course of loops above described and held only by the cylinder-needles constitutes the dividing course which may be pulled out or unraveled at the desired time to thereby separate the tops one from the other. To, however, connect a series of cuffs or tops in a circular web, this dividing course when made and while yet held to the cylinder-needles is immediately followed by a course knitted on both sets of needles by the threads supplied from the thread-guide 37. While the thread-guide 37 is presenting its thread for this last course the slide 46 is moved outwardly to thereby prevent the dial-needles from taking thread from the thread-guide 41, and at the completion of the full course referred to, made on both sets of needles, the switch is depressed into its lowest position, and in the next rotation of the machine both sets of needles will be fed each with one of the main threads, and each set of needles will make a course in each side wall of the welt, the first course at the inner side of the welt being composed of the thread taken from the thread-guide 41, before referred to, while the thread delivered to the dial-needles in the production of the first course for the outer wall of the welt will be the thread taken from one of the two fingers 101 or 103, that depending upon whether, as stated, the outer wall of the welt is to be composed of one of the threads used in the royal-rib knitting or a thread differing in color or material.

During the operation of knitting the welt, which has been hereinbefore described, each of two main threads is supplied to a course in the inner or outer wall of the welt, one course being knitted a little behind the other course, as hereinbefore stated, and the production of these independent walls in plain stitch is continued until the welt shall have been made of the proper length—say usually from twelve to twenty courses; but it will be understood that the length of the welt determined by the number of courses may be varied at will by simply adding more or less high links 68 to the chain 69. The welt having been knitted of the proper length, the switches for actuating the cylinder and dial needles are returned into their normal position for rib-knitting, and if the outer wall of the welt was being knitted with a thread of different color or material the proper thread to be used in rib-knitting instead of that thread will be put into operation and the thread to be removed, it having completed the outer wall of the welt will be cut off and the machine will knit rib-stitch for any desired number of courses, that depending upon the length desired for the cuff or top, and, as before stated, to prepare the end of the cuff for ready adaptation to another garment the rib-stitch knitting will be changed to royal rib or tuck stitch, and that knitting having been carried on to the proper point brings us again to the point where the dividing course hereinbefore described is inserted. When the knitted web is separated by withdrawing the dividing course, the operator will unravel the dividing course, leaving one end of each cuff terminated by loops forming part of the rib or tuck stitch and the other end with a finished tubular welt of any desired width, the welt presenting from the connection of its end with the rib-knitting to the outer edge of the welt a tubular fabric composed of knitted wales extending from rib-knitting on the outside of the top about the welt and terminating with the rib of knitting at the inside of the cuff, the threads forming the two portions of the welt being the same, it may be, as the threads which form the body of the ribbed fabric.

We have herein described, as we prefer for the production of the most perfect work, that the dividing course hereinbefore referred to follow a plurality of royal rib or tuck stitch courses; but the machine herein described may, if one should desire, make the dividing course to follow a rib-stitch course, and to do this it would be necessary only to omit the royal rib or stitch links $69^\times$ from the chain 69. When the links $69^\times$ come into operative position below the stem 64, carrying the cam 62, they lift said cam, putting its edge in such position that it will pass between the edges of the two levers 70 and 78, said cam in such intermediate position meeting a stud $78^\times$, extended downwardly from the lever 78, moving said lever in such direction as to actuate the slide-bar 80, moving it for a distance sufficiently to effect the depression of the plunger $d^3$, carrying the cams $d^4$ and $d^{4\times}$, putting them in the full-line position, Fig. 16, or in their inoperative position, that said cams will not act to lift the needles to knit, but only to take a thread, so that the needles may at one point where they are lifted take threads in their hooks and hold said thread until the needle again takes a second thread, the needle drawing the second thread through the two loops of thread then held on its shank.

It will be noted that the ribbed portion of the fabric is produced from a plurality of threads—two in the present instance—and that when the welt is to be formed these same main threads are knitted, one on the cylinder and the alternate one on the dial needles, thus continuing the same threads used in the main body of the ribbed fabric to produce the welt without the introduction of an auxiliary thread. If, however, one portion or wing of the welt is desired to be of a different quality or color of thread from that in the other portion or wing, then one of the main knitting-threads may be replaced by such different character or colored thread at the time the change is made from rib to welt knitting; but in such case the said substituted thread is in reality and effect a mere continuation of one of the main body-threads, as will be evident.

The machine herein described has a stop-motion ring $e$, provided at its under side with a series of feet $e'$, which rest loosely on a plate $e^2$, connected to and moving with the spindle B'. The upper side of the ring $e$ is provided with ratchet-teeth $e^3$, which whenever a weighted portion of a stop-finger $e^4$, mounted on a stud $e^5$, held by a suitable ear, as $e^6$, rising from the central hub $e^{2\times}$ of the plate $e^2$, drops, due to the breaking of a thread, are engaged by one of the stop-fingers causing the ring $e$ to travel with the plate $e^2$. When the ring $e$ is started, it acts by one of its feet $e'$ against an arm $e^7$, extended laterally from an upright shaft $e^8$, and turns said shaft in its bearing against the stress of a spring $e^{10}$, causing an arm $e^{12}$ of said shaft acting through a chain $e^{13}$, connected with an arm $e^{14}$ of a rock-shaft $e^{15}$, to turn said rock-shaft, it through usual appliances releasing the rod $e^{16}$, carrying the usual belt-shipper, so that a spring, as $e^{17}$, may act to move said rod $e^{16}$ and transfer the usual driving-belt (not shown) to the loose pulley $A^2$ to stop the machine. The belt-shipper may be actuated to stop the machine whenever desired by the operator depressing the hand-lever $e^{19}$, connected with the shaft $e^{15}$. (See Fig. 1.) The rotation of the ring $e$ during knitting is restrained by the action of the arm $e^7$, due to the stress of the spring $e^{10}$. The hub $e^{2\times}$ of the plate $e^2$ is surrounded inside the ring $e$ with a finger-controlling ring $f$. (See Figs. 13 and $13^a$, the latter figure showing a part only of said ring in side elevation.) The ring $f$ is provided at its upper side with a series of stop-surfaces and a series of notches $f^2$, said surfaces when knitting is going on occupying a position immediately below the weighted parts of the stop-fingers $e^4$, which coact with threads that at that time are not being knitted into the fabric, the notches $f^2$ standing below the weighted parts of the stop-fingers $e^4$, which coact with the threads being knitted into the fabric, said stop-fingers being held up away from said ring $f$ by means of the tension on the thread running through them to the needles. In this condition if a thread which is running to the needles breaks the finger coacting with it will instantly drop into the notch $f^2$ and in so doing will come into engagement with one of the ratchet-teeth and stop the machine.

We have herein shown six fingers $e^4$ and have represented the machine as provided with two thread-guides, and coöperating with one of the thread-guides there are two thread-changers, and each thread-changer and one of said thread-guides is provided with two threads, so that two of the fingers $e^4$ act simultaneously on threads going to the thread-changer and the said thread-guide.

In case a change of thread is desired—as, for instance, when knitting a two-walled welt using a different-colored thread controlled by, say, one of the fingers—then the ring $f$ must be changed in its position to place a surface underneath the weighted parts of the stop-finger which coact with the thread which is to be thrown out of the knitting and place the notched parts $f^2$ of the ring under the weighted part of the finger coacting with the thread which is to be knitted into the fabric.

By a change of position of the ring $f$ any one or more of the fingers hanging on and producing tension on the thread being knitted may be free to drop into a notch of the ring $f$ in case of the breakage of a thread and cause said finger to actuate the stop-motion ring. This movement of the ring $f$ is effected in the following manner: The upper side of the ring $f$ is provided, as shown, with two pins $f^3$, and the space between these pins is entered by an arm $f^4$, connected by a screw $f^5$ with a rock-shaft $f^6$, having attached to it in suitable manner a block $f^8$, said block having jointed to it by a suitable stud-screw $f^9$ a link $f^{10}$, having a hole at its end, which is entered by the screw 121 before described as entering the link 122, which is moved whenever one of the thread-changers is to be put into its operative and the other thread-changer into its inoperative position, and consequently whenever the thread-changers are moved the ring $f$ is also moved.

In Fig. 13 the finger $e^4$ at the left is shown as occupying its dropped position, (the position it will assume when a thread breaks,) said finger engaging the ratchet-teeth of the stop-wheel and stopping the machine.

Having fully described our invention, what we claim as new, and desire to secure by Letters Patent, is—

1. In a knitting-machine, a plurality of thread-guides for delivering a plurality of main knitting-threads, dial and cylinder needles, cams for causing both the dial and cylinder needles to knit with all the threads delivered by the plurality of thread-guides in the production of a ribbed fabric, pattern-controlled means for changing the relation of the cams in the cylinder to cause the cylinder-needles to take thread and knit from the alternate thread-guides, and devices operative after said pattern-controlled means to change the relations of the cams in the dial-cam plate to cause the dial-needles to take and knit with thread from the alternate thread-guides that do not supply the cylinder-needles.

2. In a knitting-machine, two thread-guides for delivering two main knitting-threads, dial and cylinder needles, cams for causing both the dial and cylinder needles to knit with both threads delivered by the two guides in the production of a ribbed fabric, and means for changing the relations of the cams in the dial and cylinder whereby the dial-needles are caused to continue knitting with one of the main knitting-threads, and the cylinder-needles with the other of said knitting-threads in the formation of a welt, and devices operative in the formation of the welt for substituting for one of the main knitting-threads a thread of a different character or color.

3. In a knitting-machine for knitting rib-stitch by two sets of needles, a plurality of thread-guides for supplying a plurality of main knitting-threads to both sets of needles, knitting-cams to operate both sets of needles, each set having a movable switch occupying its operative position during rib-knitting, and means to put said switches in their inoperative positions that the needles of each set thereafter in the operation of the machine may take the main knitting-threads which are not supplied to the other set of needles, thereby enabling each set of needles receiving only its own main thread which extends into the body of the ribbed fabric to knit course after course of plain-stitch knitting to constitute the inner and outer walls of a welt and a running-off cam for the dial-needles for the production of a dividing course of loops between the rib and welt knitting.

4. In a knitting-machine of the class described, a plurality of thread-guides for delivering a plurality of main knitting-threads, a cylinder to contain the cylinder-needles, cams for actuating the cylinder-needles including a movable switch having a passage-way for the needle-butts with a cam on each side of said passage-way, means for moving said movable switch to place its passage-way in any one of three different positions with relation to the cylinder-cams, a dial-needle bed to contain dial-needles, a dial-cam plate, cams including a dial-switch for actuating the dial-needles, and means for placing the said dial-switch in either of two positions.

5. In a knitting-machine, a needle-cylinder to contain cylinder-needles, a thread-guide to supply said needles with a main knitting-thread, a cam for moving said cylinder-needles, said cam having a switch; a dial-needle bed to contain dial-needles, shifting thread-guides to deliver one or another main knitting-thread to said dial-needles, a dial-needle cam having a switch, said switches when in their operative positions enabling said cylinder-needles to take a main thread from its own thread-guide and from all the thread-guides for the dial-needles, and the said dial-needles to take a main thread from one of its thread-guides and the thread-guides supplying thread to the cylinder-needles to knit a rib-stitch; means to put said switches automatically into their inoperative positions that each set of said needles may take a main thread from its own thread-guide only for welt-knitting, and means to change the thread-guides supplying the dial-needles with thread for welt-knitting that one wall of the welt may present a thread of a different color or material.

6. In a knitting-machine, a needle-cylinder to contain cylinder-needles, a thread-guide to supply said needles with a main knitting-thread, a cam for moving said cylinder-needles, said cam having a switch movable into three different positions for the formation of rib, royal-rib, or welt knitting; a dial-needle bed to contain dial-needles, shifting thread-guides to deliver one or another of a plurality of main knitting-threads to said dial-needles, a dial-needle cam having a switch, said switches when in their operative positions enabling said cylinder-needles to take a main thread from its own thread-guide and from the thread-guides for the dial-needles, and the said dial-needles to take a main thread from its thread-guides and also from the thread-guides supplying thread to the cylinder-needles to knit a rib-stitch; means to put said switches automatically into their inoperative positions that each set of said needles may take a main thread from only its own thread-guide for welt-knitting, means to change the thread-guides supplying the dial-needles with a main thread for welt-knitting that one wall of the welt may present a thread of a different color or material, and means to cut the outgoing thread after the end of the incoming thread has been caught by the needles.

7. In a knitting-machine, a needle-cylinder to contain cylinder-needles, a dial-needle bed to contain dial-needles, a plurality of thread-guides for supplying main knitting-threads to said cylinder and dial needles, a dial-cam plate, and a cam for moving the cylinder-needles, said plate and said cam having each a movable switch, each switch occupying its operative position when knitting rib-stitch and inoperative position during the formation of the welt, and means for moving the switch of the cam for actuating the cylinder-needles, into an intermediate position to prevent the cylinder-needles from rising high enough to cast their loops or stitches while taking threads from one of said thread-guides, enabling said needles during the intermediate position of said switch to knit the royal rib or tuck stitch.

8. In a knitting-machine, a needle-cylinder to contain cylinder-needles, a dial-needle bed to contain dial-needles, a plurality of thread-guides, a dial-cam plate, and a cam for moving the cylinder-needles, said plate and said cam having each a movable switch, each switch occupying its operative position when knitting rib-stitch, means for moving the switch of the cam for actuating the cylinder-needles, putting said cam into an intermediate position to prevent the cylinder-needles from rising high enough to cast their loops or stitches while taking threads from one of said thread-guides, enabling said needles during the intermediate position of said switch to knit the royal rib or tuck stitch, and a running-off cam to run off from the dial-needle the loops put thereon for one course to enable the cylinder-needles to form loops for a dividing course.

9. In a knitting-machine, a needle-cylinder to contain cylinder-needles, a dial-needle bed to contain dial-needles, a plurality of thread-guides, a dial-cam plate, and a cam for moving the cylinder-needles, said plate and said cam having each a movable switch, each switch occupying its operative position when knitting rib-stitch, means for moving the switch of the cam for actuating the cylinder-needles, putting said cam into an intermediate position to prevent the cylinder-needles from rising high enough to cast their loops or stitches while taking threads from one of said thread-guides, enabling said needles during the intermediate position of said switch to knit the royal rib or tuck stitch, a running-off cam to run off from the dial-needles the loops put thereon for one course to enable the cylinder-needles to form loops for a dividing course, and means for moving the switch of the dial-cam from its operative into its inoperative position, and the switch of the cam for moving the cylinder-needles from its intermediate position into its inoperative position, whereby in the further operation of the machine each set of needles will take a thread from one of said thread-guides and knit two plain webs, one web forming the outer and the other the inner wall of a welt.

10. In a knitting-machine, a needle-cylinder to contain cylinder-needles, a dial-needle bed to contain dial-needles, a plurality of thread-guides, a dial-cam plate, and a cam for moving the cylinder-needles, said plate and said cam having each a movable switch, each switch occupying its operative position when knitting rib-stitch, means for moving the switch of the cam for actuating the cylinder-needles, putting said cam into an intermediate position to prevent the cylinder-needles from rising high enough to cast their loops or stitches while taking threads from one of said thread-guides, enabling said needles during the intermediate position of said switch to knit the royal rib or tuck stitch, a running-off cam to run off from the dial-needle the loops put thereon for one course to enable the cylinder-needles to form loops for a dividing course, means for moving the switch of the dial-cam from its operative into its inoperative position, and the switch of the cam for moving the cylinder-needles from its intermediate position into its inoperative position, whereby in the further operation of the machine each set of needles will take a thread from one of said thread-guides and knit two plain webs, one web forming the outer and the other the inner wall of a welt, and means on the completion of a welt of the desired length to move said switches into their operative position to enable rib-knitting to follow welt-knitting, whereby the two walls of the plain-stitch knitted welt of equal lengths are united in the body of the tubular rib fabric being knitted.

11. In a knitting-machine, a plurality of thread-guides for delivering a plurality of main knitting-threads, two sets of needles arranged in different planes, a cylinder and dial-needle bed for said two sets of needles, cams for causing both sets of needles to take and knit with all the main knitting-threads in the production of a ribbed fabric, means for changing the relation of the cams in the two sets to cause one set of needles to knit with each alternate thread and the other set of needles to knit with the remaining threads in the production of a welt, the inthrowing portions of the cams for the dial-needles having cam-faced easing-blocks in the path of the dial-needles to throw the dial-needles partially toward the center of the dial-needle bed after they have been moved in the opposite direction by the dial-cams.

12. In a knitting-machine, a plurality of thread-guides for delivering a plurality of main knitting-threads, two sets of needles arranged in different planes, a cylinder and dial-needle bed for said two sets of needles, cams for causing both sets of needles to take and knit with all the main knitting-threads in the production of a ribbed fabric, means for changing the relation of the cams in the two sets to cause one set to knit with each alternate thread and the other set of needles to knit with the remaining threads in the production of a welt, the cams for the dial-needles having cam-faced easing-blocks in the path of the dial-needles to throw the dial-needles partially toward the center of the dial-needle bed after they have been moved in the opposite direction by the dial-cams, and means to automatically vary the length of the stitch made by the dial-needles.

13. In a knitting-machine a plurality of thread-guides for delivering the main knitting-threads, two sets of needles arranged in different planes, cams for causing both sets of needles to take and knit with all the main knitting-threads in the production of a ribbed fabric, a plunger carrying a plurality of cams adjacent the cylinder-needle-actuating cams, a slide carrying a cam adjacent the dial-needle-actuating means and separate means for automatically moving the plunger and slide to change the position of the cams carried by them to cause one set of needles to knit with each alternate thread and the other set of needles to knit with the remaining threads in the production of a welt.

14. In a knitting-machine, a plurality of thread-guides for delivering the main knitting-threads, two sets of needles arranged in different planes, cams for causing both sets of needles to take and knit with all the main knitting-threads in the production of a ribbed fabric, means for changing the relation of the cams in the two sets whereby one set of needles is caused to knit with each alternate thread and the other set of needles with the remaining threads in the production of a welt, a running-off cam and means for operating it comprising a spring-pressed lever, and pattern-controlled devices for moving the same at desired times in the production of a dividing course of loops.

15. In a machine of the character described, the combination of a plurality of thread-guides for delivering a plurality of knitting-threads, a cylinder for carrying cylinder-needles and cams for operating the same, a dial-bed for carrying dial-needles and cams for operating the dial-needles, a slide carrying a plurality of cams for the cylinder-needles in the formation of rib and welt knitting, a switching-cam for the dial-needles, means for moving the dial and switching cams into position for the formation of a welt, and separately-operative devices for returning said parts to their position for rib-knitting on the completion of the welt.

16. In a knitting-machine, the combination of a plurality of thread-guides for delivering a plurality of knitting-threads, a cylinder carrying cylinder-needles, and cylinder-cam for operating the same, a dial-bed carrying dial-needles and dial-cams for operating the same, a slide carrying a switching-cam adjacent the dial-needle-operating cams, means under control of a pattern for moving the slide to throw the switching-cam into inoperative position in the formation of a welt, cams, as $d^4 d^{4\times}$, adjacent the cylinder-cams and means for moving said last-mentioned cams into their lowest position in the formation of a welt to cause the cylinder-needles to take thread from each alternate thread-guide and the dial-needles to take thread from the remaining guides, and devices for returning the switching-cam and cams $d^4 d^{4\times}$ to operative position when the welt has been formed, so that the dial and cylinder needles will thereafter take and knit with all the threads.

In testimony whereof we have signed our names to this specification in the presence of two subscribing witnesses.

AVERY B. DODGE.
JOHN H. RICE.

Witnesses:
L. D. HEYNE,
JOHN WHITE.